ly, and finally, filtering circuitry to filter high and low
frequency interfering signals including DC offset.

United States Patent
Zolfaghari

(10) Patent No.: US 7,620,371 B2
(45) Date of Patent: Nov. 17, 2009

(54) TRANSMITTER SIGNAL STRENGTH INDICATOR

(75) Inventor: Alireza Zolfaghari, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 475 days.

(21) Appl. No.: 10/929,641

(22) Filed: Aug. 30, 2004

(65) Prior Publication Data

US 2006/0025081 A1   Feb. 2, 2006

Related U.S. Application Data

(60) Provisional application No. 60/592,743, filed on Jul. 30, 2004.

(51) Int. Cl.
*H04B 1/00* (2006.01)

(52) U.S. Cl. .................. 455/69; 455/85; 455/550.1; 455/214; 455/226; 455/115.1; 455/115.2; 455/67.11; 455/226.1; 455/226.2; 455/73

(58) Field of Classification Search .................. 455/69, 455/85, 550.1, 214, 226, 115.1, 115.2, 67.11, 455/226.1, 226.2, 73
See application file for complete search history.

(56) References Cited

U.S. PATENT DOCUMENTS

| 4,476,442 | A | * | 10/1984 | Iwamatsu | 330/265 |
| 5,146,614 | A | * | 9/1992 | Furuno | 455/571 |
| 5,546,027 | A | * | 8/1996 | Shinozaki et al. | 327/59 |
| 5,640,691 | A | * | 6/1997 | Davis et al. | 455/126 |
| 6,049,702 | A | * | 4/2000 | Tham et al. | 455/78 |
| 6,232,802 | B1 | * | 5/2001 | Chang et al. | 327/59 |
| 6,518,840 | B1 | * | 2/2003 | Rahn et al. | 330/149 |
| 6,556,815 | B1 | * | 4/2003 | Shibamura | 455/126 |

(Continued)

*Primary Examiner*—Duc Nguyen
*Assistant Examiner*—Amar Daglawi
(74) *Attorney, Agent, or Firm*—Garlick Harrison & Markison; James A. Harrison

(57) ABSTRACT

A single chip radio transceiver includes circuitry that enables received wideband RF signals to be down-converted to baseband frequencies and baseband signals to be up-converted to wideband RF signals prior to transmission without requiring conversion to an intermediate frequency. The circuitry includes a low noise amplifier, automatic frequency control circuitry for aligning a local oscillation frequency with the frequency of the received RF signals, signal power measuring circuitry for measuring the signal to signal and power ratio and for adjusting frontal and rear amplification stages accordingly, and finally, filtering circuitry to filter high and low frequency interfering signals including DC offset.

29 Claims, 12 Drawing Sheets

PMOS envelope detector

U.S. PATENT DOCUMENTS

| | | | |
|---|---|---|---|
| 6,836,156 B2* | 12/2004 | Chien | 327/58 |
| 6,950,634 B2* | 9/2005 | Dykstra et al. | 455/78 |
| 6,950,636 B2* | 9/2005 | Rozenblit et al. | 455/126 |
| 6,985,702 B2* | 1/2006 | Hahn | 455/77 |
| 7,088,999 B2* | 8/2006 | Shih et al. | 455/423 |
| 7,113,754 B2* | 9/2006 | Chien | 455/115.3 |
| 7,171,179 B2* | 1/2007 | Zhou | 455/226.2 |
| 7,184,721 B2* | 2/2007 | Asirvatham et al. | 455/115.2 |
| 2002/0177417 A1* | 11/2002 | Visser | 455/83 |
| 2003/0124986 A1* | 7/2003 | Rose et al. | 455/83 |
| 2003/0138032 A1* | 7/2003 | Shi et al. | 375/219 |
| 2003/0169827 A1* | 9/2003 | Shi et al. | 375/295 |
| 2003/0190895 A1* | 10/2003 | Mostov et al. | 455/78 |
| 2003/0220081 A1* | 11/2003 | Dykstra et al. | 455/78 |
| 2004/0018821 A1* | 1/2004 | Bar-David et al. | 455/149 |
| 2004/0121795 A1* | 6/2004 | Shih et al. | 455/522 |
| 2004/0203720 A1* | 10/2004 | Shih et al. | 455/423 |
| 2004/0212401 A1* | 10/2004 | Chien | 327/58 |
| 2004/0214536 A1* | 10/2004 | Chien | 455/127.2 |
| 2004/0224715 A1* | 11/2004 | Rosenlof et al. | 455/522 |
| 2005/0017801 A1* | 1/2005 | Bachman et al. | 330/149 |
| 2005/0046474 A1* | 3/2005 | Matsumoto et al. | 330/10 |
| 2005/0159177 A1* | 7/2005 | Trachewsky et al. | 455/522 |
| 2006/0025081 A1* | 2/2006 | Zolfaghari | 455/69 |
| 2006/0178121 A1* | 8/2006 | Hamalainen et al. | 455/125 |
| 2007/0249382 A1* | 10/2007 | Trachewsky et al. | 455/522 |

* cited by examiner class B envelope detector envelope detector: single-ended input/single-ended output envelope detector- single-ended input/differential output envelope detector- differential input/single-ended output envelope detector- differential input/differential output PMOS envelope detector PMOS envelope detector- single-ended input/differential output

TRANSMITTER SIGNAL STRENGTH INDICATOR

CROSS-REFERENCE TO RELATED APPLICATION

This application claims priority to U.S. Provisional Patent Application Ser. No. 60/592,743, filed Jul. 30, 2004, which is incorporated herein by reference for all purposes.

BACKGROUND

1. Technical Field

The present invention relates to wireless communications and, more particularly, to power detection circuits for wireless communication systems.

2. Related Art

Communication systems are known to support wireless and wire-lined communications between wireless and/or wire-lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switched telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with the particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, which typically includes one or more intermediate frequency stages, a filtering stage, and a data recovery stage. The low noise amplifier receives an inbound RF signal via the antenna and amplifies it. The one or more intermediate frequency stages mix the amplified RF signal with one or more local oscillations to convert the amplified RF signal into a baseband signal or an intermediate frequency (IF) signal. As used herein, the term "low IF" refers to both baseband and intermediate frequency signals. A filtering stage filters the low IF signals to attenuate unwanted out of band signals to produce a filtered signal. The data recovery stage recovers raw data from the filtered signal in accordance with the particular wireless communication standard.

Often it is desirable to know an output transmission power level for many reasons. A conventional approach to measure the transmit power is to use microwave couplers. While such an approach is satisfactory for some systems, it is not particularly beneficial for mobile systems that are often required to be small, portable, and power efficient. In particular, the microwave couplers cannot be integrated on-chip and further degrade efficiency by inserting loss into the transmit path. Thus, it is desirable to develop an integrated circuit that includes a block for detecting transmit power levels. Unfortunately, most known designs include the use of an operational amplifier coupled with supporting circuitry to detect a signal envelope which may then be used to estimate a corresponding power level. One problem with such known designs, however, is that operational amplifiers cannot handle higher frequency values. For example, an operational amplifier cannot readily be used for frequencies that exceed 1 GHz. Thus, what is needed for newer high frequency systems that operate in excess of 1 GHz, is a circuit design that may reliably detect an envelope to provide an indication of an output power level.

SUMMARY OF THE INVENTION

A transmitted signal strength indicator (TSSI) circuit provides an indication of the transmitter output power in a manner that provides accuracy over process, temperature and supply variations for high frequency applications having constant or non-constant envelopes.

The transmitter output signal can be specified as $$s(t) = A(t)\cos[\omega_c t + \phi(t)]$$

Since the variation of the envelope, A(t), is much slower than the carrier frequency, $\omega_c$, the output power delivered to the load can be approximated by $$P_L = \frac{\overline{A(t)^2}}{2R_L}$$

where $R_L$ is the load resistance. (Note that $A(t) \geq 0$). Therefore, in order to measure the output power, $A(t)^2$ may be calculated upon detection of the transmit envelope magnitude to find the output power based on the equation above. Since the carrier frequency is high, the envelope of the signal is detected by an analog envelope detector. Then the expression above can be calculated in the digital or analog domain. If the envelope of the signal is constant, $$\overline{A(t)^2} = A^2$$

the envelope can be used as an indicator of the power without any calculation.

For cases where the envelope is not constant, we can simplify the calculation more by using the average of the envelope, $\overline{A(t)}$. Using the average can potentially add some inaccuracy for a random signal. In most cases, however, the power is measured during the preamble. Since the preamble is a fixed determined signal, there exists a one-to-one correspondence between $\overline{A(t)}$ and $\overline{A(t)^2}$. Therefore, measuring $\overline{A(t)}$ can enable one to uniquely calculate the power.

A class B rectifier with a low pass filter (LPF) is used wherein it is biased at the edge of conduction. As a result, the device only works for only one-half cycle of the input. In a traditional class-B amplifier, the distortion of the signal at the output is suppressed by filtering the harmonics of the carrier using a tank tuned at the carrier frequency. On the other hand, if a low pass filter is employed instead, the output signal will be proportional to the envelope. In this case, the cut-off frequency of the LPF needs to be much smaller than the carrier frequency to suppress the carrier and large enough to pass the envelope.

While the envelope detector using a traditional class B amplifier with a resistor and capacitor as an output load has a broad frequency range (because the output is low pass filtered), it may exhibit a poor accuracy over process and temperature variations. This is due to the fact that the variation of the transistor gain is not correlated with that of the resistor. In order to resolve this issue, we can use a diode connected device instead of the resistor as shown in FIG. 5. In the described embodiments of the invention, however, the variation of the devices over temperature and process are cancelled to the first order. However, as the threshold voltage of the devices changes, the output voltage varies. This is resolved with a DC-offset calibration when there is no signal or using a differential-output topology. This circuit uses a dummy path to cancel the variations of the threshold voltage. For the cases where the input signal is differential, a full-wave rectifier can be used. It must be noted that the substrates of all devices can be connected to one common node (which is the ground node in the case of NMOS transistors) or if the technology allows, the substrate of each device can be connected to its source terminal. The latter can slightly improve the variation by eliminating an effect known as the body effect.

Since the circuit does not have any frequency limitation at the output node, NMOS transistors can be replaced by PMOS transistors. This provides more flexibility to connect the substrate of each device to its source terminal. Other aspects of the present invention will become apparent with further reference to the drawings and specification, which follow.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
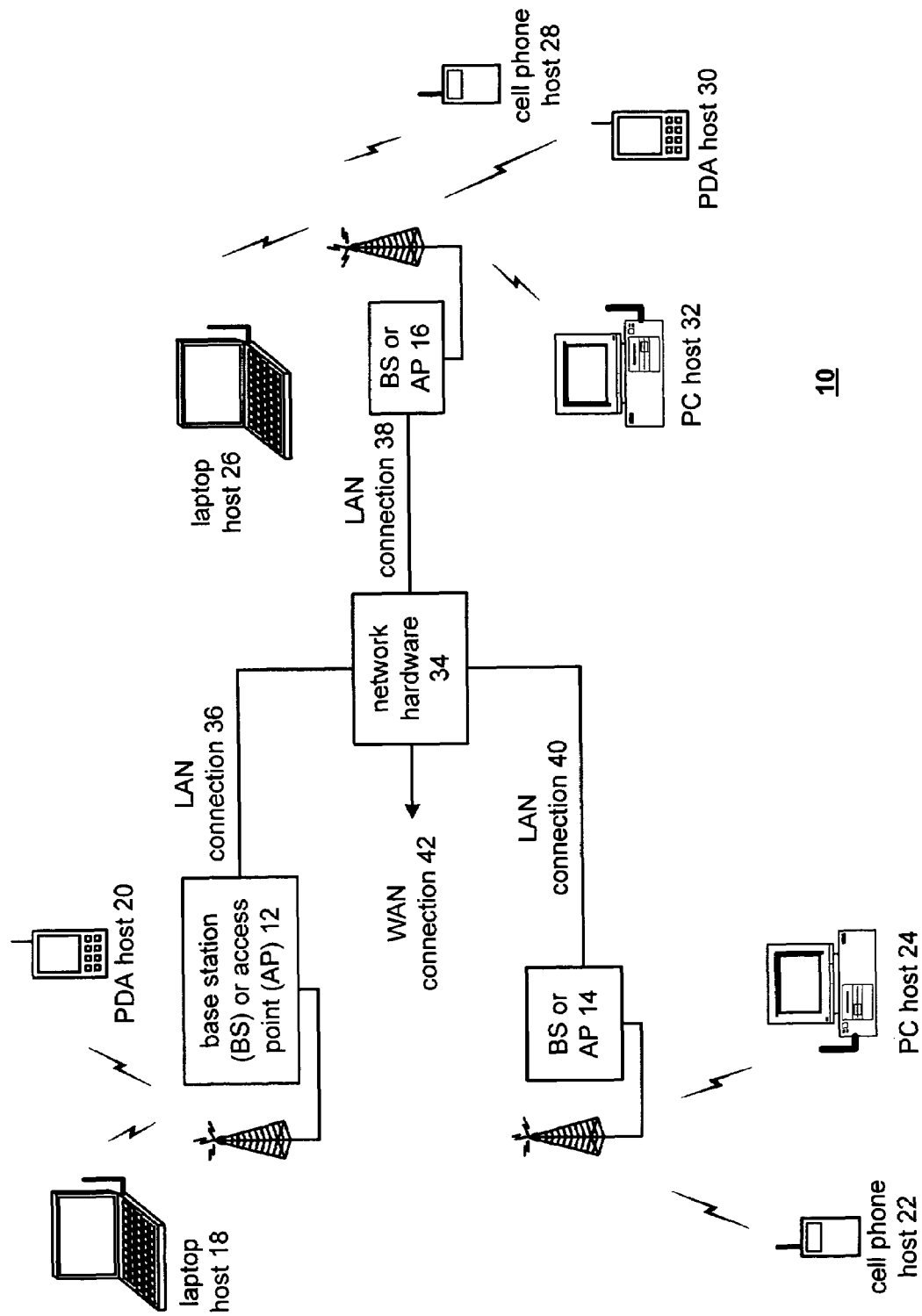
FIG. 1 is a functional block diagram illustrating a communication system that includes a plurality of base stations or access points, a plurality of wireless communication devices and a network hardware component.

FIG. 1 is a functional block diagram illustrating a communication system 10 that includes a plurality of base stations or access points (AP) 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or AP 12-16 are operably coupled to the network hardware component 34 via local area network (LAN) connections 36, 38 and 40. The network hardware component 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. As such, each wireless communication device may desirably need to know an output power level and thus includes at least some of the embodiments of the present invention.

Figure 2:
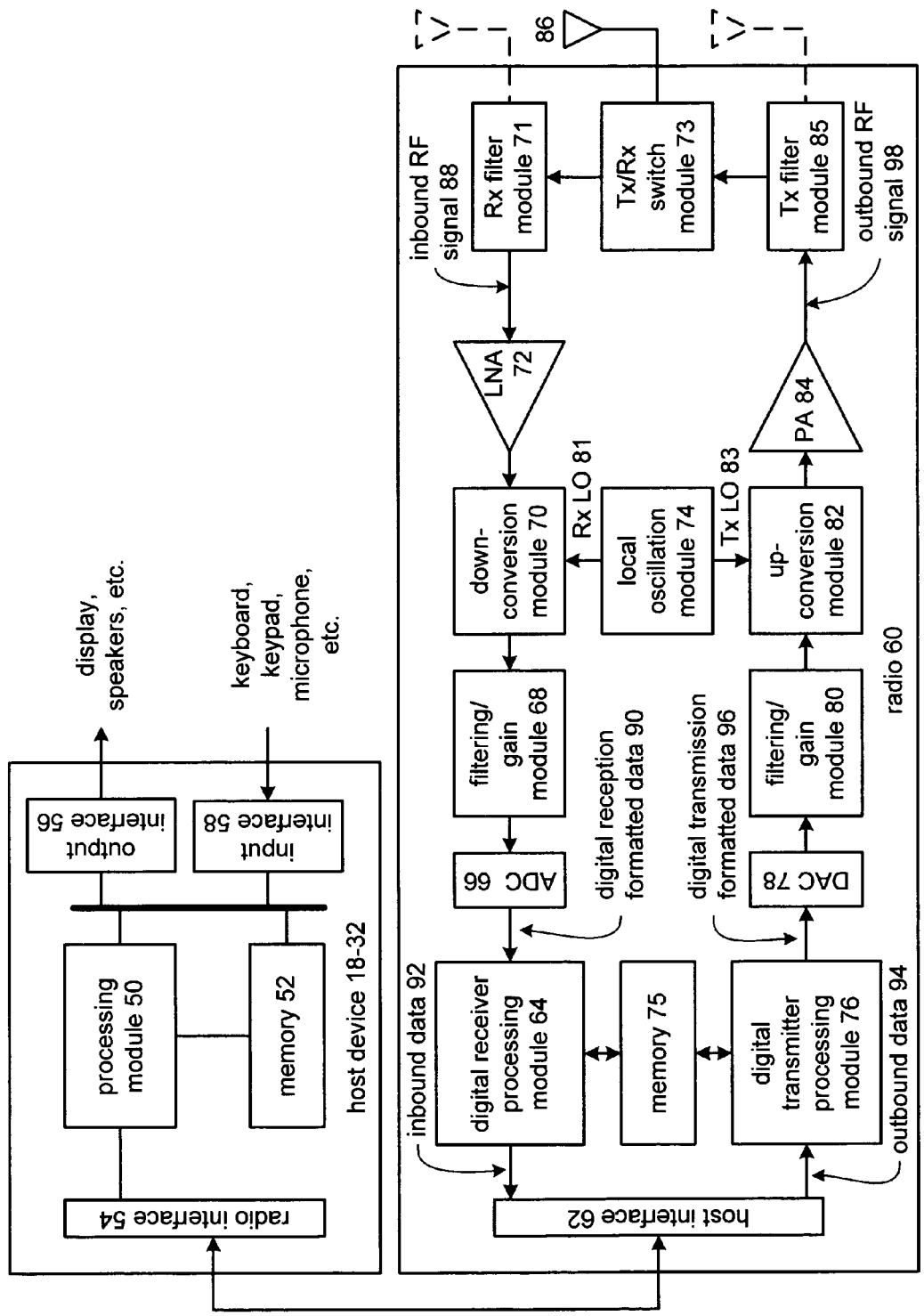
FIG. 2 is a schematic block diagram illustrating a wireless communication device as a host device and an associated radio.

FIG. 2 is a schematic block diagram illustrating a wireless communication device 18-32 as a host device and an associated radio 60. For cellular telephone hosts, the radio 60 is a built-in component. For personal digital assistant hosts, laptop hosts, and/or personal computer hosts, the radio 60 may be built-in or an externally coupled component.

As illustrated, the host wireless communication device 18-32 includes a processing module 50, a memory 52, a radio interface 54, an input interface 58 and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output device, such as a display, monitor, speakers, etc., such that the received data may be displayed. The radio interface 54 also provides data from the processing module 50 to the radio 60. The processing module 50 may receive the outbound data from an input device, such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/RX) switch module 73, a local oscillation module 74, memory 75, a digital transmitter processing module 76, a digital-to-analog converter 78, a filtering/gain module 80, an IF mixing up-conversion module 82, a power amplifier 84, a transmitter filter module 85, and an antenna 86. The antenna 86 is shared by the transmit and receive paths as regulated by the Tx/Rx switch module 73. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and/or modulation. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the digital receiver processing module 64 and/or the digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and the digital receiver processing module 64 and/or the digital transmitter processing module 76 executes, operational instructions corresponding to at least some of the functions illustrated herein.

In operation, the radio 60 receives outbound data 94 from the host wireless communication device 18-32 via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, etc.) to produce digital transmission formatted data 96. The digital transmission formatted data 96 will be a digital baseband signal or a digital low IF signal, where the low IF typically will be in the frequency range of 100 kilohertz to a few megahertz.

The digital-to-analog converter 78 converts the digital transmission formatted data 96 from the digital domain to the analog domain. The filtering/gain module 80 filters and/or adjusts the gain of the analog baseband signal prior to providing it to the up-conversion module 82. The up-conversion module 82 directly converts the analog baseband signal, or low IF signal, into an RF signal based on a transmitter local oscillation 83 provided by local oscillation module 74. The power amplifier 84 amplifies the RF signal to produce an outbound RF signal 98, which is filtered by the transmitter filter module 85. The antenna 86 transmits the outbound RF signal 98 to a targeted device, such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch module 73, where the Rx filter module 71 bandpass filters the inbound RF signal 88. The Rx filter module 71 provides the filtered RF signal to low noise amplifier 72, which amplifies the inbound RF signal 88 to produce an amplified inbound RF signal. The low noise amplifier 72 provides the amplified inbound RF signal to the down-conversion module 70, which directly converts the amplified inbound RF signal into an inbound low IF signal or baseband signal based on a receiver local oscillation signal 81 provided by local oscillation module 74. The down-conversion module 70 provides the inbound low IF signal or baseband signal to the filtering/gain module 68. The filtering/gain module 68 may be implemented in accordance with the teachings of the present invention to filter and/or attenuate the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host wireless communication device 18-32 via the radio interface 54.

As one of average skill in the art will appreciate, the wireless communication device of FIG. 2 may be implemented using one or more integrated circuits. For example, the host device may be implemented on a first integrated circuit, while the digital receiver processing module 64, the digital transmitter processing module 76 and memory 75 are implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver processing module 64 and the digital transmitter processing module 76 may be a common processing device implemented on a single integrated circuit. Further, memory 52 and memory 75 may be implemented on a single integrated circuit and/or on the same integrated circuit as the common processing modules of processing module 50, the digital receiver processing module 64, and the digital transmitter processing module 76.

The wireless communication device of FIG. 2 is one that may be implemented to include either a direct conversion from RF to baseband and baseband to RF or for a conversion by way of a low intermediate frequency. In either implementation, however, for up-conversion module 82 and down-conversion module 70, it is required to provide accurate frequency conversion. For down-conversion module 70 and up-conversion module 82 to accurately mix a signal, however, it is important that the local oscillation module 74 provide an accurate local oscillation signal for mixing with the baseband or RF by the up-conversion module 82 and down-conversion module 70, respectively. Accordingly, the local oscillation module 74 includes circuitry for adjusting an output frequency of a local oscillation signal provided therefrom. As will be explained in greater detail below, the local oscillation module 74 receives a frequency correction input that it uses to adjust an output local oscillation signal to produce a frequency corrected local oscillation signal output. While one embodiment of the present invention includes local oscillation module 74, up-conversion module 82 and down-conversion module 70 that are implemented to perform direct conversion between baseband and RF, it is understood that the principles herein may also be applied readily to systems that implement an intermediate frequency conversion step at a low intermediate frequency.

Figure 3:
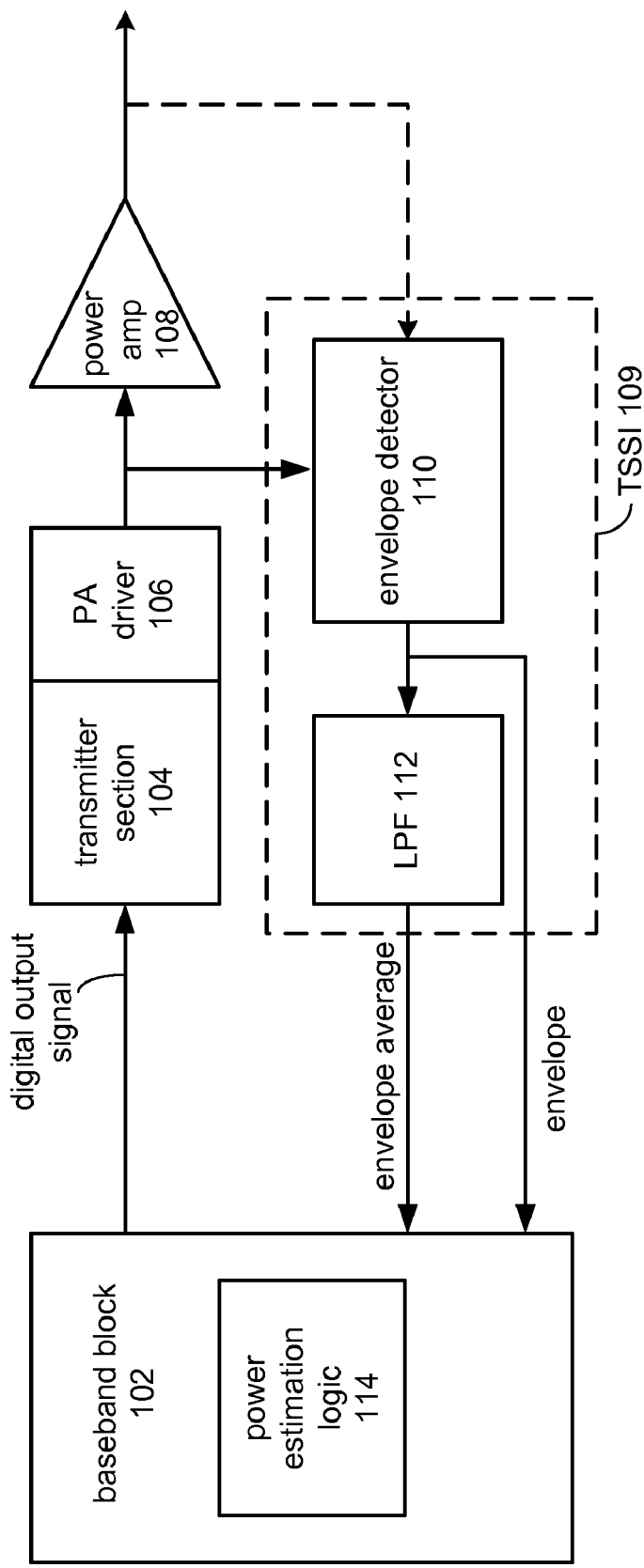
FIG. 3 is a functional block diagram of a transmitter signal strength indicator circuit formed according to one embodiment of the present invention.

FIG. 3 is a functional block diagram of a transmitter signal strength indicator system formed according to one embodiment of the present invention. A transmitter signal strength indicator (TSSI) system 100 includes a baseband block 102, transmitter section 104, and a TSSI 109 that includes an envelope detector 110 and a low pass filter (LPF) 112. Baseband block 102 produces a digital output signal to transmitter section 104. Transmitter section 104, in the described embodiment, includes amplifiers, filters, and mixers to filter, amplify, and up-convert an outgoing RF signal. Transmitter section 104 further includes a digital-to-analog converter that is coupled to receive the digital output signal to convert the digital output signal to an analog output signal, which is then amplified, filtered, and up-converted to RF. Transmitter section 104 further includes a power amplifier driver 106 that produces an amplified analog output signal to a power amplifier 108. In one embodiment of the present invention, the output of power amplifier driver 106 is also produced to envelope detector 110. As may be seen from examining envelope detector 110, envelope detector receives either the output of PA driver 106 or of power amp. 108, but no feedback is shown from the output of envelope detector 110 to the input of envelope detector 110. As may be seen in the subsequent FIGS. 4-10 that illustrate various embodiments of the amplification circuitry of envelope detector 110, no feedback loop is presented from an amplifier output to an amplifier input.

In an alternate embodiment of the invention, an output of power amplifier 108 is provided to envelope detector 110. The envelope detector 110 produces an envelope indication to a baseband block based upon the output power level of constant envelope signals. In one embodiment of the present invention, for non-constant envelope signals the output of envelope detector 110 is produced to a low pass filter 112 that produces an average envelope indication to a baseband block 102. A power estimation logic block 114 is coupled to receive either the output from envelope detector 110 or low pass filter 112 and operates upon internal logic to determine an estimate of an output power level. For exemplary purposes, in the described embodiment of the invention, the mixer of transmitter section 104 up-converts an outgoing analog signal from a baseband frequency to a frequency that exceeds 1 GHz. The envelope detector 110 includes circuitry that provides an output indication of a signal envelope of the outgoing signal. However, in the described embodiment, the output RF signal is in excess of 1 GHz while the frequency (in one embodiment) of the envelope variation of the output signal of the envelope detector 110 is approximately 1 MHz. As such, in the described embodiment of the invention, the indication provided by envelope detector 110 is provided to low pass filter 112 that further reduces the output variation frequency and produces an average filtered output of envelope detector 110 having a envelope component that is substantially reduced.

Baseband block 102 and, more specifically, power estimation logic block 114 receives an envelope average from low pass filter 112 or envelope detector 110 and, in one embodiment of the invention, multiplies the received envelope average by a constant value to estimate an output power level. In another embodiment of the invention, power estimation logic block 114 merely comprises a look-up table that maps envelope values to output power levels.

As will be described in greater detail below, the amount of multiplication that is required is a function of the circuit characteristics of envelope detector 110. For example, whether envelope detector 110 includes a single ended input or a differential input effects the multiplication factor. Similarly, whether envelope detector 110 includes a single ended output or a differential output also effects the multiplication factor. Accordingly, one of four multiplication factors are required according to the circuit characteristics of envelope detector 110. Thus, if a look-up table is used, in the alternative, a plurality of look-up tables may be required according to the circuit characteristics of envelope detector 110.

Figure 4:
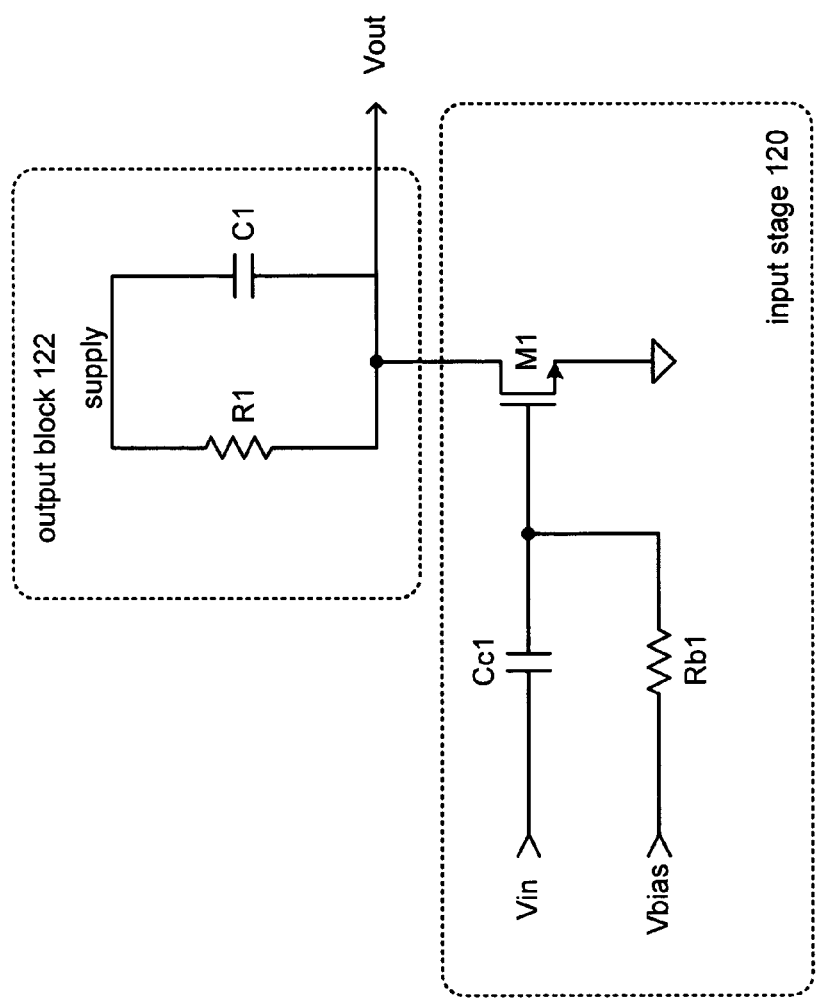
FIG. 4 is a functional schematic diagram of a class B envelope detector used in a TSSI according to one embodiment of the present invention.

FIG. 4 is a functional schematic diagram of a class B envelope detector used in a TSSI according to one embodiment of the present invention. Generally, as was mentioned above, one problem with using operational amplifiers for envelope detection for high frequency circuits is that the frequency may exceed the capacity of the operational amplifier. Accordingly, the described embodiments of the invention include an analog amplifier and, here, more particularly, a class B amplifier, that is used as a part of an envelope detector. As may be seen, an input stage 120 includes a coupling capacitor Cc1 that is coupled in parallel to a bias resistor Rb1. An input voltage is applied to Cc1, while a bias voltage is applied to Rb1. Capacitor Cc1 and resistor Rb1 are further coupled to a gate of an amplifier MOSFET M1. An output block 122 coupled to a drain of amplifier MOSFET M1 includes a resistor R1 that is coupled in parallel with a capacitor C1. A current through amplifier MOSFET M1, in this embodiment, is the equivalent of a half-wave rectified signal. Accordingly, if the input signal is sinusoidal, the current that tends to be conducted through amplifier MOSFET M1 is a half-wave rectified signal. Generally, amplifier MOSFET M1, when biased ON by $V_{in}$, will only conduct during positive transitions of $V_{in}$. It is also worth noting that coupling capacitor Cc1 blocks any DC voltage present within $V_{in}$. Thus, the voltage at the gate of amplifier MOSFET M1 is symmetrical about $V_{bias}$. Bias resistor Rb1 sets a bias level on amplifier MOSFET M1 so that amplifier MOSFET M1 is biased slightly above conduction. Accordingly, any positive signal provided by $V_{in}$ tends to bias amplifier MOSFET M1 into an ON state.

As stated before, output block 122 includes a parallel combination of resistor R1 and capacitor C1. Output block 122 filters out a high frequency carrier signal in the input signal $V_{in}$. The modulated signal envelope is therefore averaged by the low pass filter of output block 122 which has a cut-off frequency of about 10 MHz in the described embodiment of the invention. Further, resistor R1, in the described embodiment, is not matched to amplifier MOSFET M1 so that variations in process, voltage, or temperature will change the output signal level.

Figure 5:
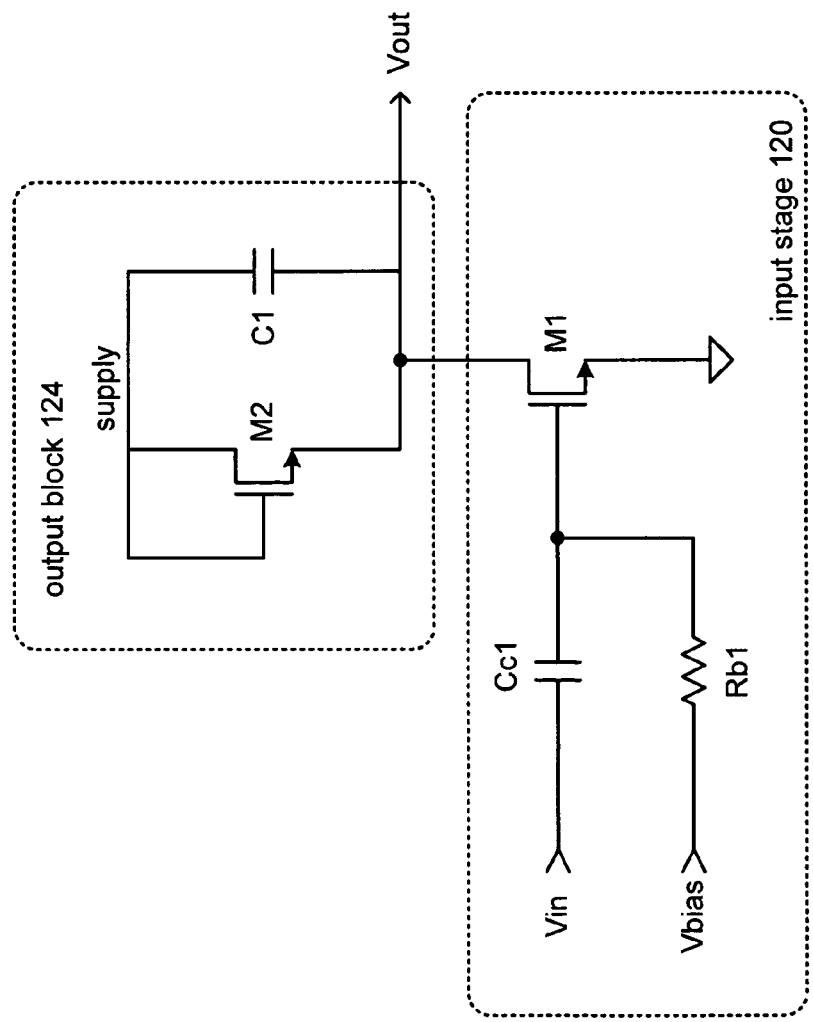
FIG. 5 is a functional schematic diagram of a TSSI formed according to a second embodiment of the present invention.

FIG. 5 is a functional schematic diagram of an envelope detector formed according to a second embodiment of the present invention. The envelope detector of FIG. 5 has a single ended input and a single ended output. Along these lines, one may see that input stage 120 of FIG. 5 is the same as input stage 120 of FIG. 4. Similarly numbered parts herein reflect similarly constructed circuit blocks or circuit elements. In the embodiment of FIG. 5, output block 122 is replaced by output block 124. Primarily, resistor R1 is replaced by a diode connected MOSFET M2. Amplifier MOSFET M1 and diode connected MOSFET M2 are matched by process so they track well with changes in process, voltage or temperature. Diode connected MOSFET M2 is biased, by the configuration shown, in saturation, i.e., the linear region, and is formed to have a resistance that is approximately equal to 1/gm. Diode connected MOSFET M2, with capacitor C1, forms a low pass filter that operates similarly to the low pass filter of output block 122 of FIG. 4 but avoids some of the shortcomings, including output voltage variation due to process, voltage, or temperature variations. The gain of the circuit is proportional to $g_{m1}/g_{m2}$. Accordingly, changes in process, voltage and temperature that effect MOSFET M1 also effect MOSFET M2 thereby providing greater circuit stability.

For constant envelope input signals, a DC value of $V_{out}$ is the average of the half-wave rectified envelope across amplifier MOSFET M1. For non-constant envelopes, $V_{out}$ is proportional to the envelope. The proportionality is based on the linearity of $g_{m2}$ to $g_{m1}$.

It should be noted that amplifier MOSFET M1 inverts the signal coupled to the gate. Because amplifier MOSFET M1 inverts the signal coupled to the gate, the output node from the drain of amplifier MOSFET M1 shall be referred to herein as a negative output to indicate that the output is inversely proportional to the input envelope. It is understood, of course, that this is merely the terminology chosen herein and that the invention is not limited to inverting amplifiers.

Figure 6:
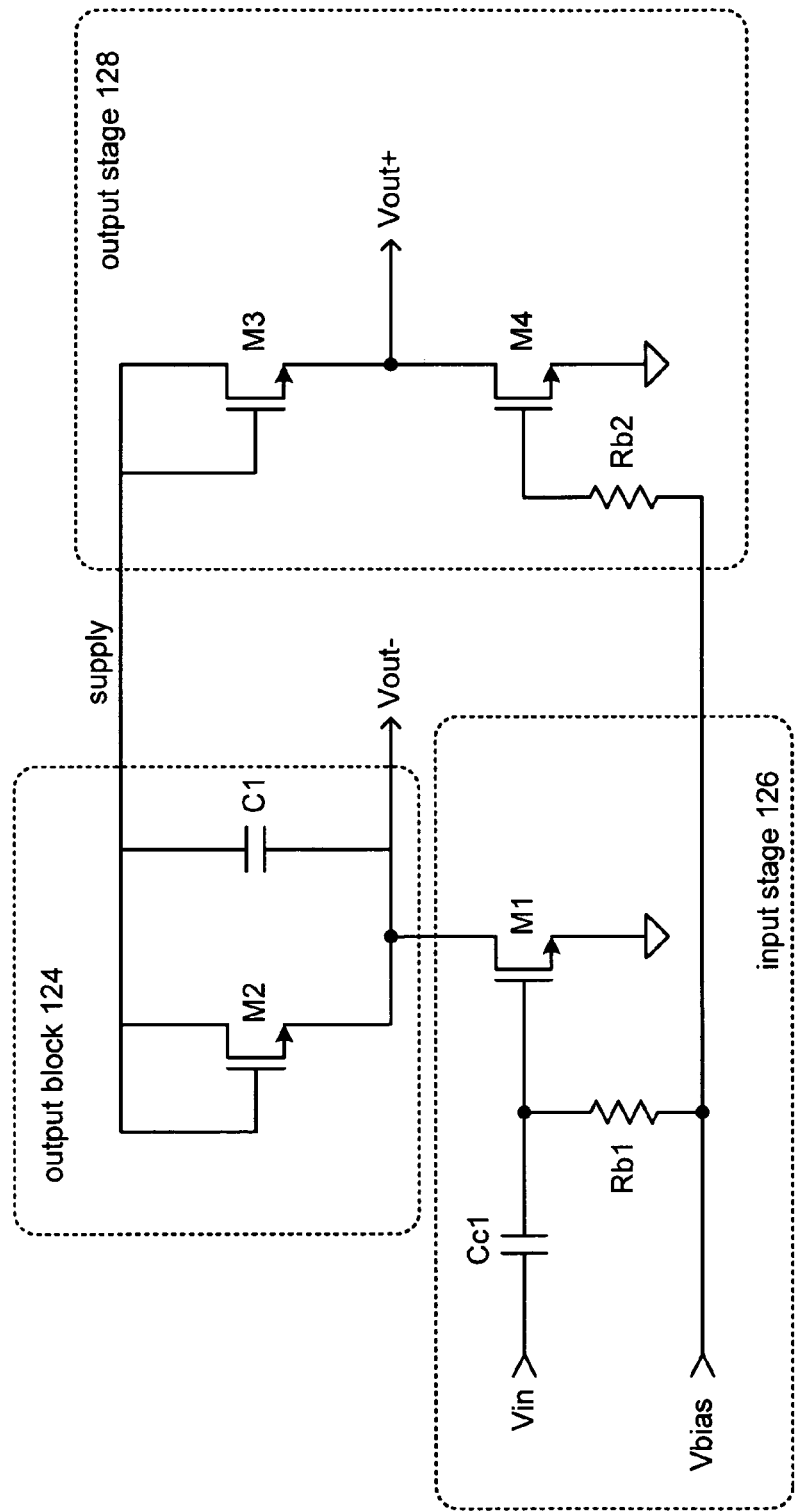
FIG. 6 is a functional schematic diagram of an envelope detector having a single ended input and a differential output according to a third embodiment of the present invention.

FIG. 6 is a functional schematic diagram of an envelope detector having a single ended input and a differential output according to a third embodiment of the present invention. As may be seen, output block 124 that was described in relation to FIG. 5 is also shown herein. Input stage 126 is very similar to input stage 120. The embodiment of FIG. 6 further includes an output stage 128 that includes an output diode connected MOSFET M3 that is coupled in series with an output stage MOSFET current source M4. A gate of output stage MOSFET current source M4 is coupled to resistor Rb2 which is also coupled to resistor Rb1, and an input node that receives $V_{bias}$. In some embodiments of the invention, resistors Rb1 and Rb2 are sufficiently large to adequately attenuate any AC component of $V_{bias}$ from reaching the gate of output stage MOSFET current source M4. However, some embodiments may include a bias capacitor coupled between $V_{bias}$ and circuit common to improve decoupling for $V_{bias}$ by effectively shunting any AC signal appearing at the node between resistor Rb1 and $V_{bias}$ to circuit common.

Referring now to output stage 128, output stage diode connected MOSFET M3 is substantially matched to diode connected MOSFET M2, while output stage MOSFET current source M4 is substantially matched to amplifier MOSFET M1. Resistor Rb2 is substantially matched to resistor Rb1. Thus, a nominal DC value of $V_{out}$ is substantially matched to a DC value of $V_{out}-$. Thus, $V_{SUPPLY}-V_{TH}$ of diode connected MOSFET M2 is substantially equal to $V_{SUPPLY}-V_{TH}$ of output stage diode connected MOSFET M3. When these DC components are summed in a downstream circuit, component, or other device, the DC values cancel, leaving a positive envelope voltage without a DC bias level. As may be seen, $V_{out}+$ is a node formed between the source of output stage diode connected MOSFET M3 and the drain of output stage MOSFET current source M4.

Figure 7:
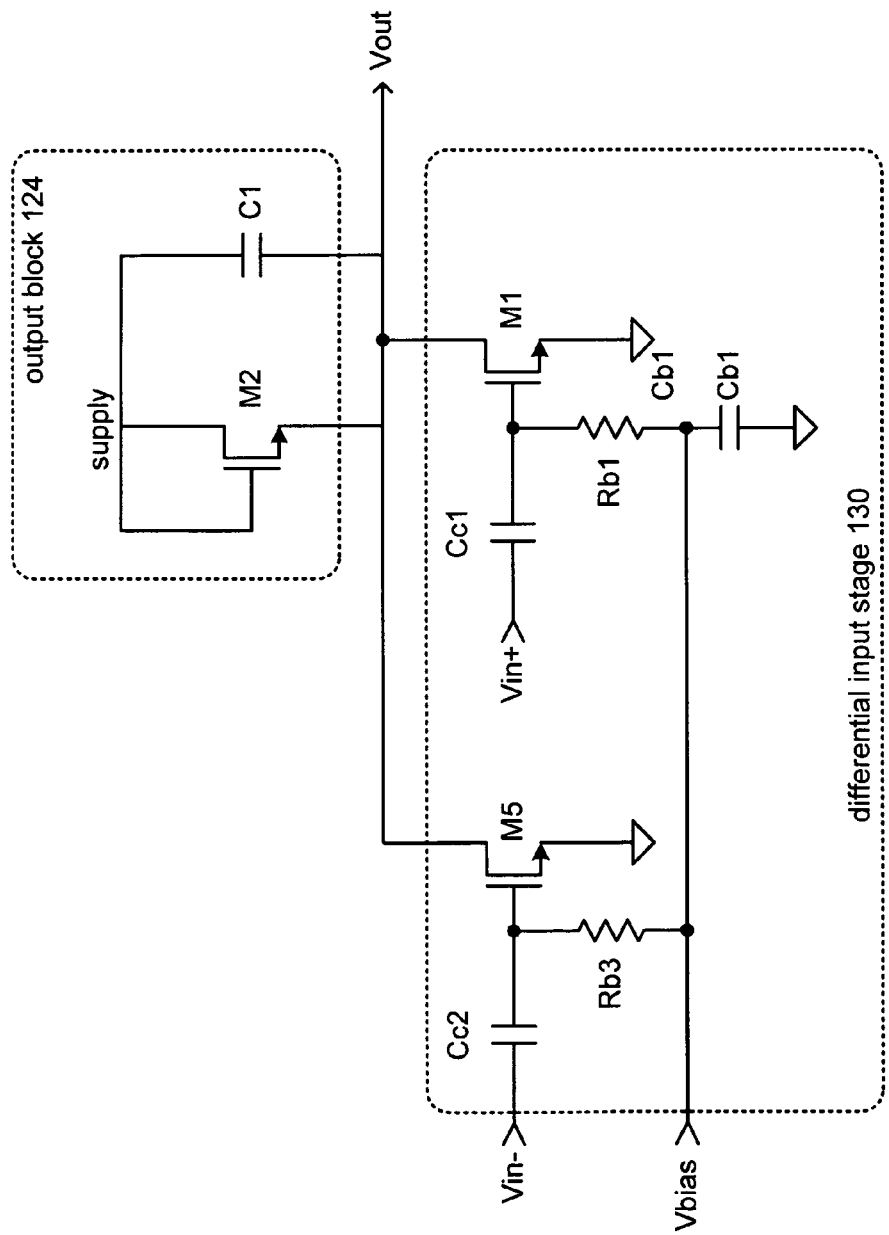
FIG. 7 is a functional schematic diagram of an envelope detector with a differential input and a single ended output according to a fourth embodiment of the present invention.

FIG. 7 is a functional schematic diagram of an envelope detector with a differential input and a single ended output according to a fourth embodiment of the present invention. Output block 124 from the previous figures, is coupled to a differential input stage 130 that includes a first amplifier MOSFET M1 and a second amplifier MOSFET M5. As before, resistor Rb1 is coupled between a gate of first amplifier MOSFET M1 and $V_{bias}$. Again, as before, a bypass capacitor Cb1 is further provided between Rb1, $V_{bias}$, and circuit common. A capacitor Cc1 is further provided between an input node to receive $V_{in}+$ and the gate of first amplifier MOSFET M1.

The circuitry for receiving a second input of the differential input is similarly constructed. A resistor Rb3 is coupled between a gate of second amplifier MOSFET M5 and $V_{bias}$. Similarly, a capacitor Cc2 is coupled between a negative differential input and the gate of second amplifier MOSFET M5. Drains of first amplifier MOSFET M1 and second amplifier MOSFET M5 are commonly coupled to $V_{out}$ and to the output block 124.

In the previous embodiment that comprised a single ended input stage, input stage 120 of FIG. 5 and input stage 126 of FIG. 6, both provided a half-wave rectified signal. Here, because a differential input is provided, an output signal at $V_{out}$ tends to be a full-wave rectified signal. As may be seen, $V_{in}$ is differential with the first phase coupled to $V_{in}+$ and a second phase coupled to $V_{in}-$. During a positive transition of $V_{in}$, first amplifier MOSFET M1 couples a first phase of the half-wave rectified signal to the low pass filter of output block 124. During a negative transition of $V_{in}+$, first amplifier MOSFET M1 is OFF. When $V_{in}+$ is negative, however, $V_{in}-$ is positive which turns second amplifier MOSFET M5 ON which therefore conducts a second phase of the half-wave rectified signal to the low pass filter of output block 124. The resultant full-wave rectified signal is then filtered by the low pass filter of output block 124, which produces a DC value that tracks the envelope of the full-wave rectified signal. In the previous embodiments that comprised a single ended input, the resultant rectified signal that was filtered by low pass filter, also tracked the envelope of the input signal. However, the full-wave rectified signal provides greater gain. Thus, the DC value of the envelope is substantially higher (approximately twice in one embodiment) than the enveloped DC value of the half-wave rectified signal of the previous figures which had only a single ended input. As before, capacitor Cb1 decouples high frequency components of $V_{in}$ coupled to $V_{bias}$ by resistors Rb1 and Rb3.

Figure 8:
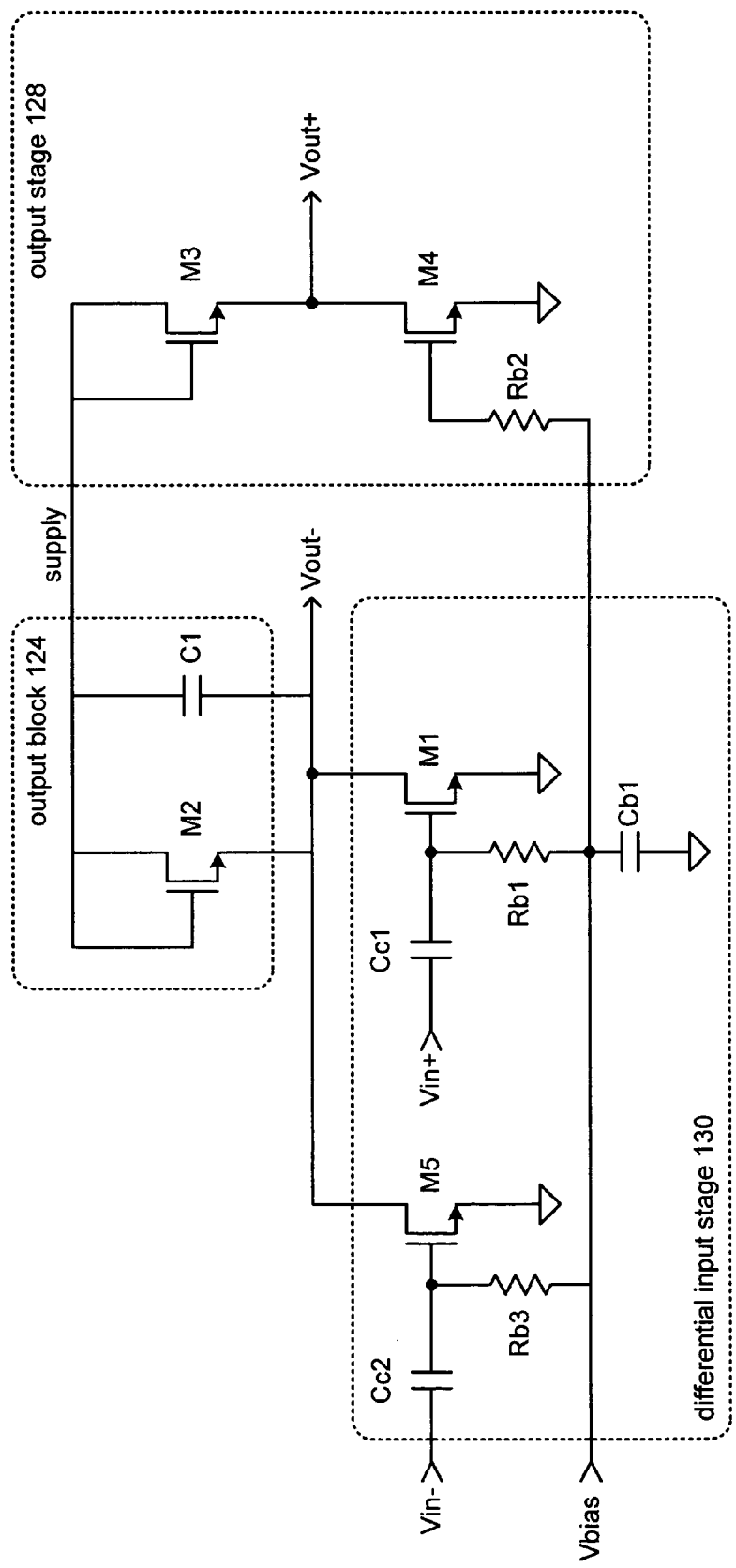
FIG. 8 is a functional schematic diagram of an envelope detector having a differential input and a differential output according to a fifth embodiment of the present invention.

FIG. 8 is a functional schematic diagram of an envelope detector having a differential input and a differential output according to a fifth embodiment of the present invention. As may be seen, the envelope detector of FIG. 8 includes differential input stage 130 that operates as described before, output block 124 that operates as described before, and output stage 128 that also operates as described before. As such, differential input stage 130 produces a full-wave rectified signal that is low pass filtered by output block 124 and is produced to output stage 128 that provides a differential output. As before, $V_{out}+$ is a DC value that is common but different in magnitude to a DC value at $V_{out}-$. Accordingly, the DC outputs cancel in the differential output of the envelope detector of FIG. 8 thereby producing an output signal that only contains a non-DC component.

Figure 9:
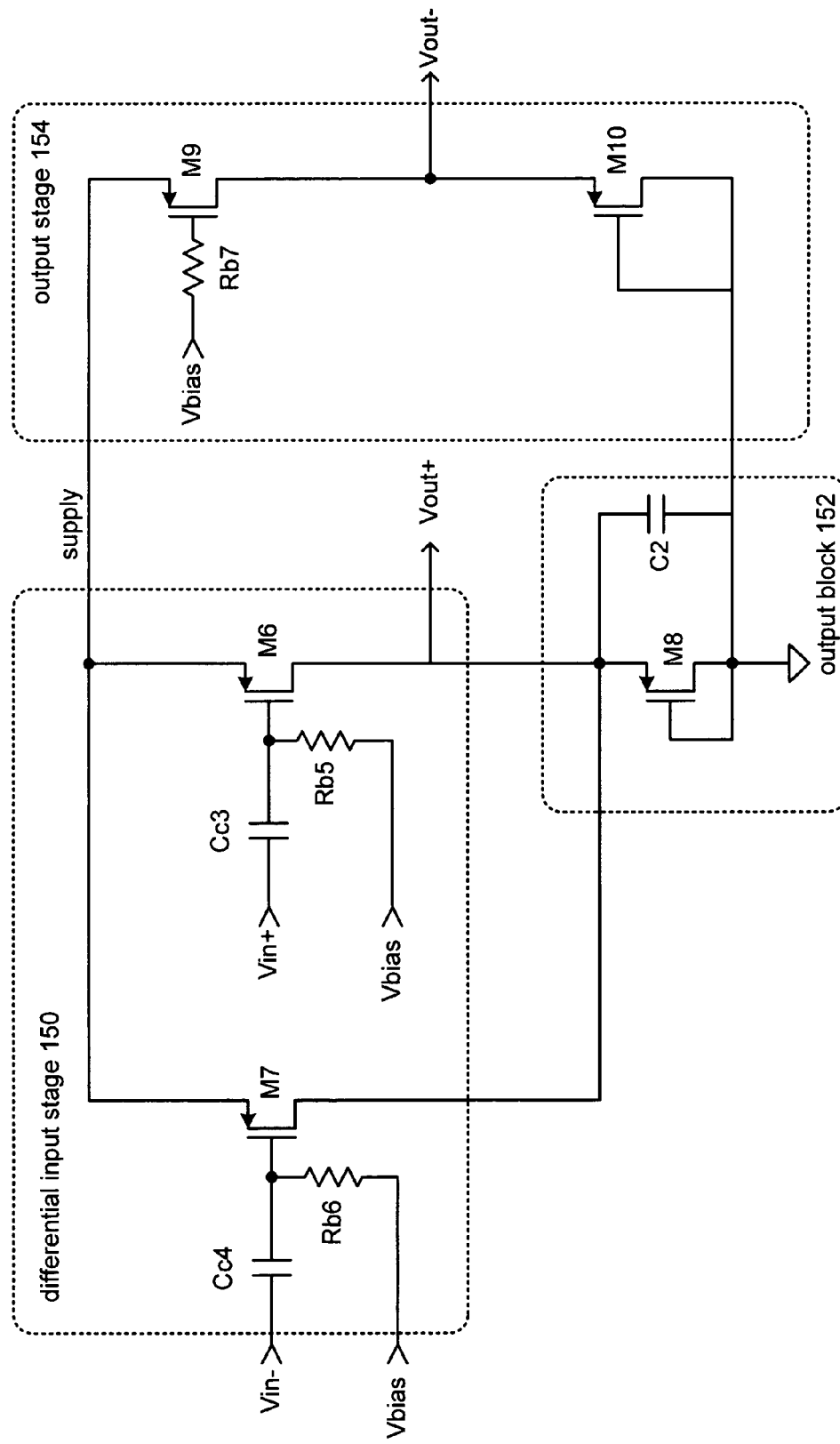
FIG. 9 is a functional schematic diagram of a PMOS detector according to a sixth embodiment of the present invention.

FIG. 9 is a functional schematic diagram of a PMOS detector according to a sixth embodiment of the present invention. As may be seen, the PMOS envelope detector of FIG. 9 includes a differential input stage 150 that produces an output signal, here, a full-wave rectified output signal because of the differential input that is low pass filtered by an output block 152. The filtered output of output block 152 is then provided as one of the circuit outputs. The operation of PMOS envelope detector of FIG. 9 is similar to the envelope detector of FIG. 8 but is formed of PMOS transistors that have opposite current flows. One of average skill in the art may readily understand the operation of the PMOS envelope detector of FIG. 9 based on the descriptions of the previous figures.

More specifically, differential input stage 150 comprises first amplifier MOSFET M6 and second amplifier MOSFET M7. The gate of first amplifier MOSFET M6 is coupled to input capacitor Cc3 and resistor Rb5. The gate of second amplifier MOSFET M7 is coupled to input capacitor Cc4 and resistor Rb6. Output block 152 is comprised of PMOS transistor M8 that is coupled in parallel to capacitor C2. Output stage 154 includes output stage MOSFET current source M9. A gate of output stage MOSFET current source M9 is coupled to resistor Rb7 which is coupled to receive $V_{bias}$. Output stage 154 further includes output stage diode connected MOSFET M10. As before, an output node $V_{out}+$ is coupled between MOSFETs M9 and M10. Further, as before, an output $V_{out}-$ is coupled between output block 152 and differential input stage 150 substantially as shown in FIG. 9. Generally, the circuit of FIG. 9 is a PMOS version of the circuit of FIG. 8. One problem, however, with most CMOS technologies is that the body of an NMOS transistor, such as in FIG. 6, can not be connected to the source. This causes an effect that is known as a body effect (which leads to variations in the threshold of a device that does not match threshold voltage levels of other devices within the circuit even if process variations do not exist). This is especially true for MOSFETs that do not have a source coupled to circuit common. Advantageously, therefore, using PMOS transistors, the source is formed in an integrated circuit well so that coupling the body to the source eliminates the body effect.

MOSFETs M6 and M7 are biased by $V_{bias}$ to be slightly conducting. Stated differently, MOSFETs M6 and M7 are biased by $V_{bias}$ to be $|V_{TH}|$+ a small voltage below the supply. MOSFET M7, therefore, turns ON fully when Vin– goes negative. Thus, an input signal will alternately turn on and off first amplifier MOSFET M6 and second amplifier MOSFET M7 as described previously in the other figures for the NMOS versions of this circuit. MOSFET transistors M6 and M7 each produce a half-wave rectified signal to output block 152. The resultant full-wave rectified signal is filtered by output block 152 to produce an envelope voltage at $V_{out}+$.

MOSFETs M9 and M10 produce a DC voltage at $V_{out}-$ that is substantially equal to the DC component produced at $V_{out}+$. Thus, when summed in a downstream circuit device, the DC components cancel, resulting in a positive going detected envelope that is proportional to the envelope of the input signal.

Figure 10:
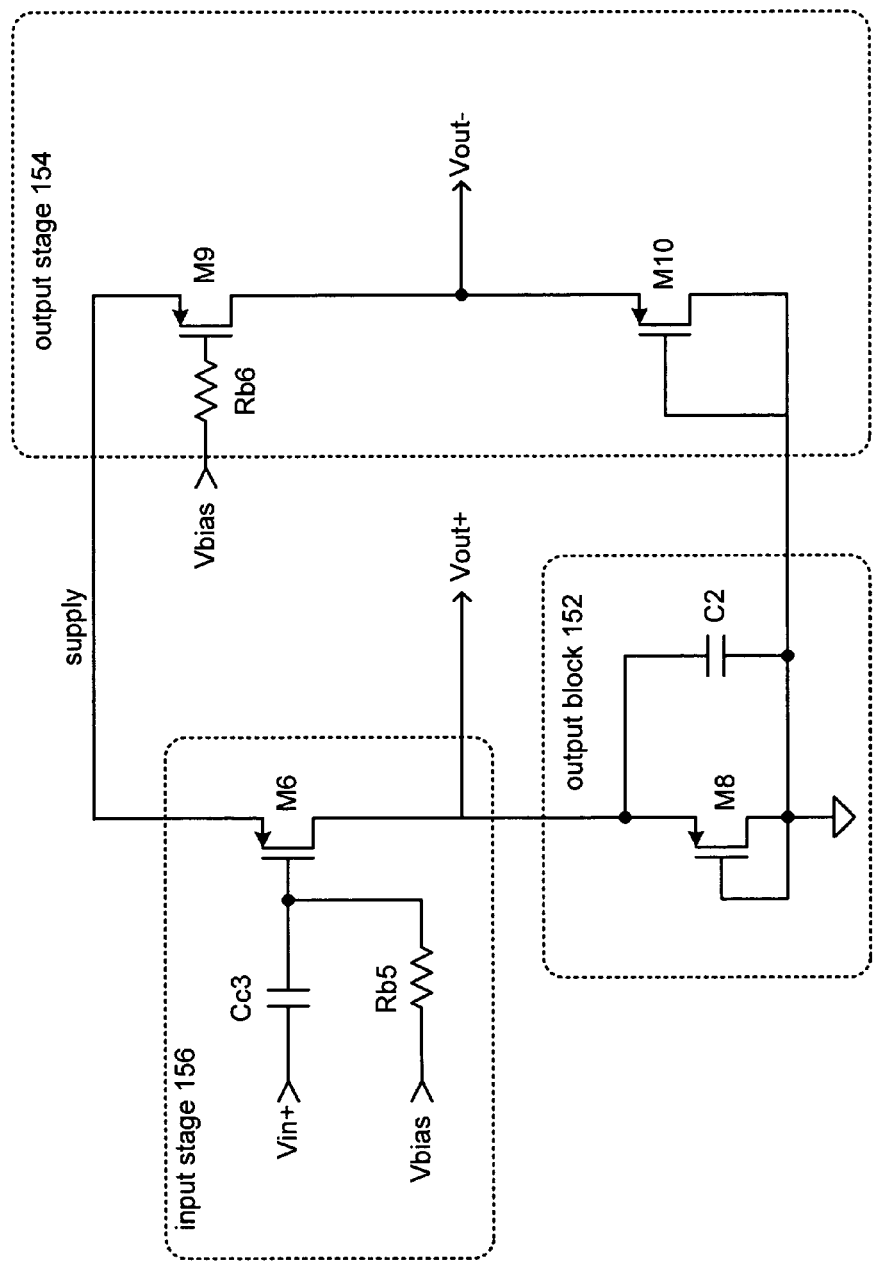
FIG. 10 is a PMOS envelope detector having a single ended input and a differential output according to a seventh embodiment of the present invention.

FIG. 10 is a PMOS envelope detector having a single ended input and a differential output according to a seventh embodiment of the present invention. The operation of the PMOS envelope detector of FIG. 10 is similar to that of FIG. 9 except that the single ended input only provides half-wave rectification. The magnitude of the output voltage is proportional to the average of the half-wave rectified signal and substantially tracks, on a proportional basis, the envelope of the input signal. More specifically, as may be seen, output stage 154 and output block 152 are as described in FIG. 9, but input stage 156 only includes first amplifier MOSFET M6, input capacitor Cc3, and resistor Rb5.

Figure 11:
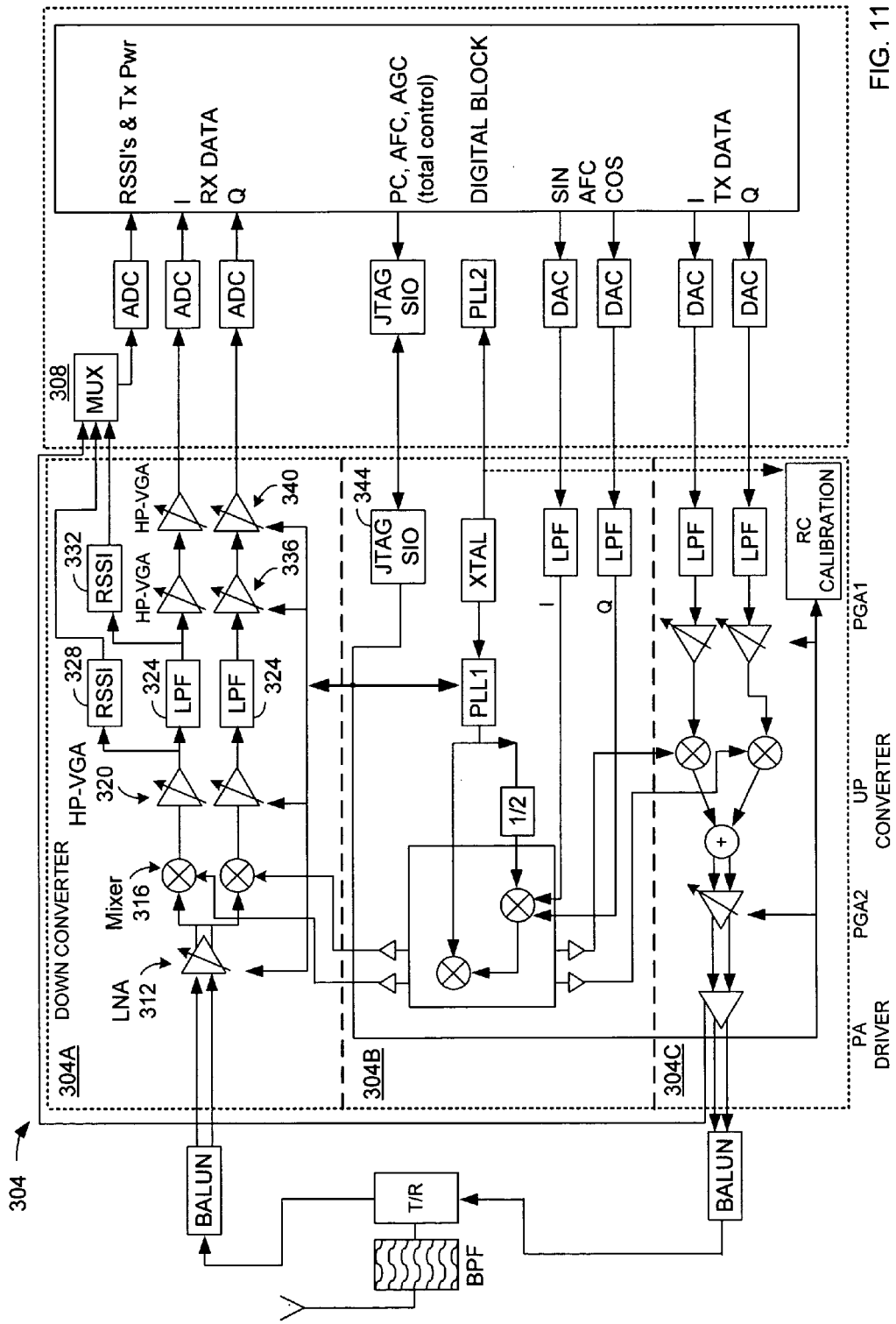
FIG. 11 is a functional schematic diagram of a direct conversion radio transceiver formed according to one embodiment of the present invention.

FIG. 11 is a functional schematic diagram of a direct conversion radio transceiver formed according to one embodiment of the present invention. Referring now to FIG. 11, a transceiver system comprises radio circuitry 304 that is coupled to baseband processing circuitry 308. The radio circuitry 304 performs filtering, amplification, frequency calibration (in part) and frequency conversion (down from the RF to baseband and up from baseband to the RF). Baseband processing circuitry 308 performs the traditional digital signal processing in addition to partially performing the automatic frequency control. As may be seen, the single chip radio circuitry 304 is coupled to receive radio signals that are initially received by the transceiver and then converted by a Balun signal converter, which performs single end to differential conversion for the receiver (and differential to single end conversion for the transmitter end). The Balun signal converters are shown to be off-chip in FIG. 11, but they may be formed on-chip with radio circuitry 304 as well. Similarly, while the baseband processing circuitry 308 is shown off-chip, it also may be formed on-chip with radio circuitry 304.

Radio circuitry 304 and, more particularly, circuitry portion 304A, includes a low noise amplifier 312 that is coupled to receive RF signals from a transceiver port. The low noise amplifier 312 then produces an amplified signal to mixers 316 that are for adjusting and mixing the RF with a local oscillation signal. The outputs of the mixers 316 (I and Q components of quadrature phase shift keyed signals) are then produced to a first HP-VGA 320.

The outputs of the first HP-VGA 320 are then produced to a first RSSI 328 as well as to a low pass filter 324. The outputs of the low pass filter 324 are then produced to a second RSSI 332, as well as to a second HP-VGA 336 and a third HP-VGA 340 as may be seen in FIG. 11.

In operation, the first RSSI 328 measures the power level of the signal and interference. The second RSSI 332 measures the power level of the signal only. The baseband processing circuitry 308 then determines the ratio of the RSSI measured power levels to determine the relative gain level adjustments of the front and rear amplification stages. In the described embodiment of the invention, if the power level of the signal and interference is approximately equal to or slightly greater than the power level of the signal alone, then the first amplification stages are set to a high value and the second amplification stages are set to a low value. Conversely, if the power level of the signal and interference is significantly greater than the power of the signal alone, thereby indicating significant interference levels, the first amplification stages are lowered and the second amplification stages are increased proportionably.

Circuitry portion 304B includes low pass filters for filtering I and Q component frequency correction signals and mixer circuitry for actually adjusting LO signal frequency.

The operation of mixers and phase locked loop for adjusting frequencies is known. Circuitry portion 304B further includes JTAG (Joint Test Action Group, IEEE1149.1 boundary-scan standard) serial interface (SIO) circuitry 344 for transmitting control signals and information to circuitry portion 304A (e.g., to control amplification levels) and to a circuitry portion 304C (e.g., to control or specify the desired frequency for the automatic frequency control).

A portion of the automatic frequency control circuitry that determines the difference in frequency between a specified center channel frequency and an actual center channel frequency for a received RF signal is formed within the baseband circuitry in the described embodiment of the invention. This portion of the circuitry includes circuitry that coarsely measures the frequency difference and then measures the frequency difference in the digital domain to obtain a more precise measurement and to produce frequency correction inputs to circuitry portion 304B.

Finally, radio circuitry portion 304C includes low pass filtration circuitry for removing any interference that is present after baseband processing, as well as amplification, mixer and up-converter circuitry for preparing a baseband signal for transmission at the RF.

Figure 12:
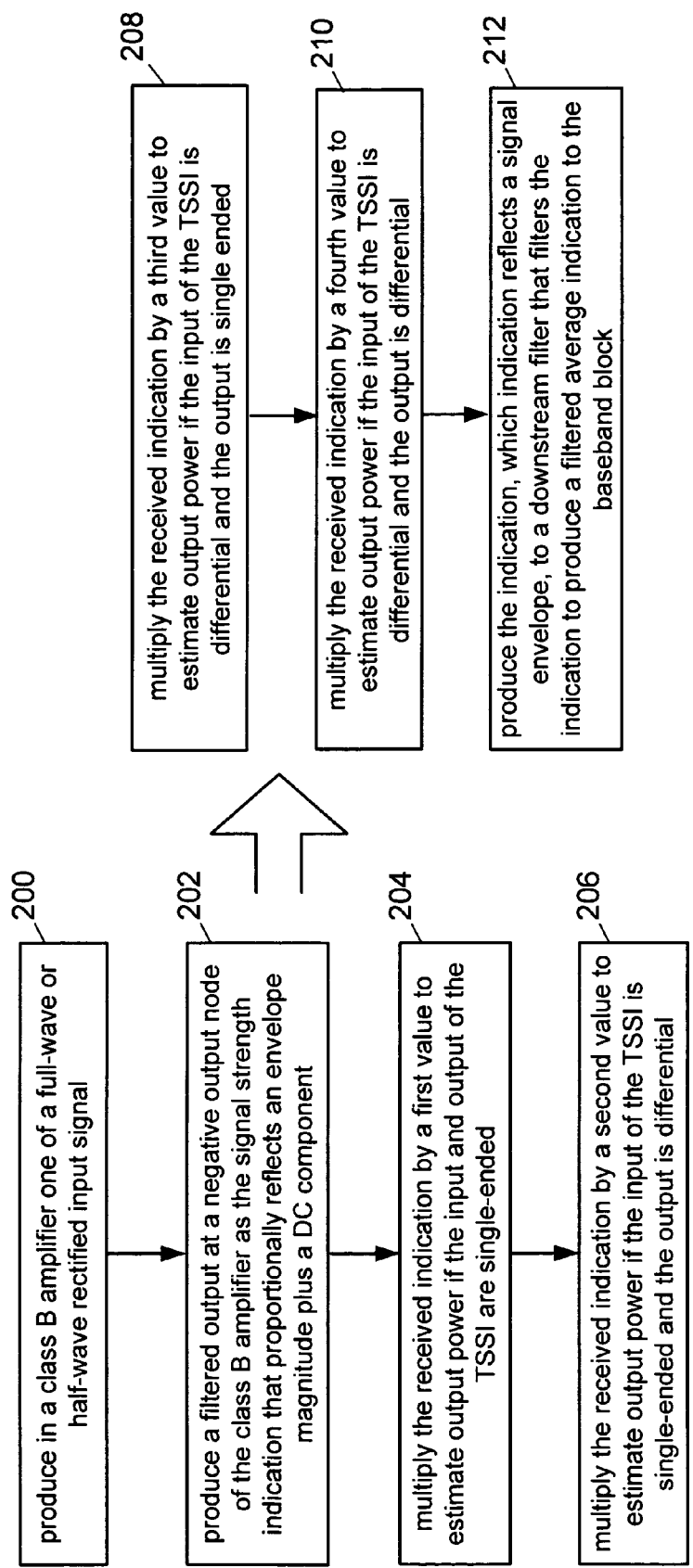
FIG. 12 is a flow chart illustrating a method according to one embodiment of the present invention.

FIG. 12 is a flow chart illustrating a method according to one embodiment of the present invention. Initially, the method includes producing, in a class B amplifier, one of a full-wave or half-wave rectified input signal (step 200). Thereafter, the invention includes producing a filtered output at a negative output node of the class B amplifier as a signal strength indication that proportionately reflects an envelope magnitude plus a DC component (step 202). The invention further includes one of four multiplication steps. Either the invention includes multiplying the received indication by a first value to estimate output power if the input and output of the TSSI are single ended (step 204). Alternatively, the invention includes multiplying the received indication by a second value to estimate output power if the input of the TSSI is single ended and the output is differential (step 206). Alternatively, the invention includes multiplying the received indication by a third value to estimate output power if the input of the TSSI is differential and the output is single ended (step 208). Or, finally, the invention includes alternatively multiplying the received indication by a fourth value to estimate output power if the input of the TSSI is differential and the output is differential (step 210). Regardless of which multiplication step is performed to estimate output power, the invention further optionally includes initially producing the indication, which indication reflects a signal envelope, to a downstream filter that filters the indication to produce a filtered average indication to the baseband block (step 212). As described previously, the second layer of filtration may be used to further reduce a frequency of the indication that substantially reflects a signal envelope.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. A Radio Frequency (RF) transceiver integrated circuit comprising:
   a local oscillator that generates an RF local oscillation signal corresponding to an RF channel;
   a receiver section operably coupled to the local oscillator to receive the RF local oscillation signal, wherein the receiver section receives an incoming RF signal, and wherein the receiver section down-converts the incoming RF signal based upon the RF local oscillation signal to produce an incoming baseband signal;
   a transmitter section operably coupled to the local oscillator to receive the RF local oscillation signal, wherein the transmitter section receives an outgoing baseband signal, and wherein the transmitter section up-converts the outgoing baseband signal to produce an outgoing RF signal, the transmitter section further including a power amplifier driver for driving the outgoing RF signal; and
   an analog conversion block for producing a digital representation of the incoming baseband signal;
   a digital conversion block for producing an outgoing analog signal based upon a digital output signal;
   a baseband block for processing the digital representation of the incoming baseband signal and for producing the digital output signal;
   outgoing filtering, amplification circuitry to produce the outgoing baseband signal to the transmitter section; and
   a transmitter signal strength indicator (TSSI) for providing a signal strength indication to the baseband block based upon an output power of one of a power amplifier or a power amplifier driver, wherein the TSSI further includes a class B amplifier that produces one of a full-wave or half-wave rectified output wherein the class B amplifier is configured without a feedback loop;
   wherein the class B amplifier further includes a first filter block and further wherein the filter block is tuned to produce a filtered output at a negative output node that proportionally reflects an envelope magnitude plus a DC component; and
   wherein the TSSI does not have a feedback loop and further wherein the TSSI further includes a second low pass filter block for producing an envelope average based on an averaged output of the first filter block.

2. The RF transceiver integrated circuit of claim 1 wherein the first filter block is an RC filter.

3. The RF transceiver integrated circuit of claim 2 wherein the first filter block further includes a diode connected MOSFET transistor coupled in parallel with a capacitive element.

4. The RF transceiver integrated circuit of claim 3 wherein the TSSI further includes an input stage coupled to a gate of an amplifier MOSFET transistor wherein the output block is coupled to a drain of the amplifier MOSFET, which drain forms a negative output of the TSSI.

5. The RF transceiver integrated circuit of claim 4 further comprising a TSSI output stage that produces an output stage voltage that is substantially equal in magnitude to the DC component to enable a downstream device to substantially cancel the DC component from the negative output of the TSSI wherein the output stage is connected across the output block and the amplifier MOSFET.

6. The RF transceiver integrated circuit of claim of claim 5 wherein the output stage further includes a diode connected MOSFET coupled in series with an output stage MOSFET current source biased to a threshold voltage level wherein a positive output node of the TSSI is between the diode connected MOSFET coupled in series with the output stage MOSFET current source.

7. The RF transceiver integrated circuit of claim 4 wherein the input stage comprises a single ended input stage and further wherein the amplifier MOSFET conducts a half-wave rectified signal that is filtered by the output block to provide the proportional indication of the envelope magnitude.

8. The RF transceiver integrated circuit of claim 4 wherein the input stage comprises a differential input stage including first and second amplifier MOSFETs and further wherein the first and second amplifier MOSFETs jointly conduct a full-wave rectified signal that is filtered by the output block to provide the proportional indication of the envelope magnitude.

9. The RF transceiver integrated circuit of claim 8 further comprising a TSSI output stage that produces an output stage voltage that is substantially equal in magnitude to the DC component to enable a downstream device to substantially cancel the DC component from the negative output of the TSSI wherein the output stage is connected across the output block and the amplifier MOSFET.

10. The RF transceiver integrated circuit of claim of claim 9 wherein the output stage further includes a diode connected MOSFET coupled in series with an output stage MOSFET current source biased to a threshold voltage level wherein a positive output node of the TSSI is between the diode connected MOSFET coupled in series with the output stage MOSFET current source.

11. A transmitter signal strength indicator (TSSI) for providing a signal strength indication to a baseband block based upon an output power of one of a power amplifier or a power amplifier driver, comprising:
 a class B amplifier that produces one of a full-wave or half-wave rectified output based upon an input signal from one of the power amplifier or power amplifier driver wherein the class B amplifier is configured without a feedback loop;
 wherein the class B amplifier further includes a filter block coupled between a supply and an amplifying element and having filtering elements sized to have a cut-off frequency in a radio frequency range and further wherein the filter block is tuned to produce a filtered output at a negative output node that proportionally reflects an envelope magnitude plus a DC component; and
 wherein the TSSI provides envelope detection without a feedback loop.

12. The TSSI of claim 11 wherein the filter block is an RC filter.

13. The TSSI of claim 12 wherein the filter block further includes a diode connected MOSFET transistor coupled in parallel with a capacitive element.

14. The TSSI of claim 13 wherein the TSSI further includes an input stage coupled to a gate of an amplifier MOSFET transistor wherein the output block is coupled to a drain of the amplifier MOSFET, which drain forms a negative output of the TSSI.

15. The TSSI of claim 14 further comprising a TSSI output stage that produces an output stage voltage that is substantially equal in magnitude to the DC component to enable a downstream device to substantially cancel the DC component from the negative output of the TSSI wherein the output stage is connected across the output block and the amplifier MOSFET.

16. The TSSI of claim 15 wherein the output stage further includes a diode connected MOSFET coupled in series with an output stage amplifier MOSFET biased to a threshold voltage level wherein a positive output node of the TSSI is between the diode connected MOSFET coupled in series with the output stage MOSFET current source.

17. The TSSI of claim 14 wherein the input stage comprises a single ended input stage and further wherein the amplifier MOSFET conducts a half-wave rectified signal that is filtered by the output block to provide the proportional indication of the envelope magnitude.

18. The TSSI of claim 14 wherein the input stage comprises a differential input stage including first and second amplifier MOSFETs and further wherein the first and second amplifier MOSFETs jointly conduct a full-wave rectified signal that is filtered by the output block to provide the proportional indication of the envelope magnitude.

19. The TSSI of claim 18 further comprising a TSSI output stage that produces an output stage voltage that is substantially equal in magnitude to the DC componet to enable a downstream device to substantially cancel the DC componet from the negative output of the TSSI wherein the output stage is connected across the output block and the amplifier MOSFET.

20. The TSSI of claim of claim 11 wherein the output stage further includes a diode connected MOSFET coupled in series with an output stage MOSFET current source biased to a threshold voltage level wherein a positive output node of the TSSI is between the diode connected MOSFET coupled in series with the output stage MOSFET current source.

21. A method in a transmitter signal strength indicator (TSSI) for providing a signal strength indication to a baseband block based upon an output of a power amplifier driver, comprising:
 producing in a class B amplifier one of a full-wave or half-wave rectified output wherein the class B amplifier is configured without a feedback loop;
 coupling a filter between a supply and an amplification element of the class B amplifier and between an output and the supply and producing a filtered output at a negative output node of the class B amplifier as the signal strength indication that proportionally reflects an envelope magnitude plus a DC component; and
 wherein the method includes producing the signal strength indication without any feedback.

22. The method of claim 21 producing an output stage voltage that is substantially equal in magnitude to the DC component to enable a downstream device to substantially cancel the DC component from the negative output of the TSSI wherein the output stage is connected across the output block and an amplifier MOSFET.

23. The method of claim 21 further including conducting a half-wave rectified signal that is filtered by the output block to provide the proportional indication of the envelope magnitude.

24. The method of claim 21 further including conducting a full-wave rectified signal that is filtered by the output block to provide the proportional indication of the envelope magnitude.

25. The method of claim 21 wherein a baseband processor multiplies the received indication by a first value to estimate output power if the input and output of the TSSI are single ended.

26. The method of claim 25 wherein the baseband processor multiplies the received indication by a second value to estimate output power if the input of the TSSI is single ended and the output is differential.

27. The method of claim 26 wherein the baseband processor multiplies the received indication by a third value to estimate output power if the input of the TSSI is differential and the output is single ended.

28. The method of claim 27 wherein the baseband processor multiplies the received indication by a fourth value to estimate output power if the input of the TSSI is differential and the output is differential.

29. The method of claim 21 further including producing the signal strength indication, which indication reflects a signal envelope, to a downstream filter that filters the indication to produce a filtered average indication to the baseband block.

* * * * *